United States Patent [19]

Hall, Jr.

[11] 4,159,464
[45] Jun. 26, 1979

[54] GEOPHONE WITH DAMPING COIL

[75] Inventor: Ernest M. Hall, Jr., Houston, Tex.

[73] Assignee: Western Geophysical Co. of America, Houston, Tex.

[21] Appl. No.: 901,162

[22] Filed: Apr. 28, 1978

Related U.S. Application Data

[63] Continuation-in-part of Ser. No. 702,783, Jul. 6, 1976, abandoned.

[51] Int. Cl.² ............................................. G01V 1/16
[52] U.S. Cl. ................................................ 340/17 R
[58] Field of Search .................... 340/17 R, 17 SP, 11, 340/10

[56] References Cited
U.S. PATENT DOCUMENTS 3,582,875  6/1971  Van Wambeck et al. ............. 340/17
3,913,063  10/1975  Sears ....................... 340/17

Primary Examiner—Theodore M. Blum
Attorney, Agent, or Firm—William A. Knox

[57] ABSTRACT

A conventional electromagnetic geophone includes a coil assembly that is spring-suspended in an air gap between concentric pole pieces of a magnet. The coil assembly is wound on the outer wall of a bobbin. The bobbin is typically made from or includes a metallic material to provide a mass for mechanical damping and a conductor for electrical eddy-current damping of the spring-suspended coil assembly. The improvement of this invention lies in mounting on the bobbin, a vernier mechanical damping mass made of a coil of insulated wire. The coil is open-ended and the mechanical damping force is adjustable in accordance with the number of turns in the coil.

3 Claims, 3 Drawing Figures

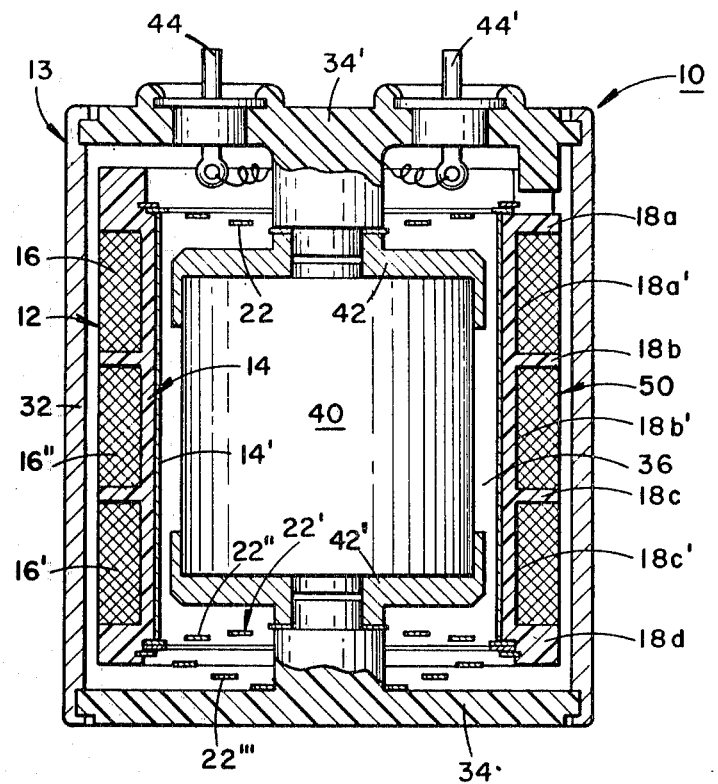
FIG. 1.
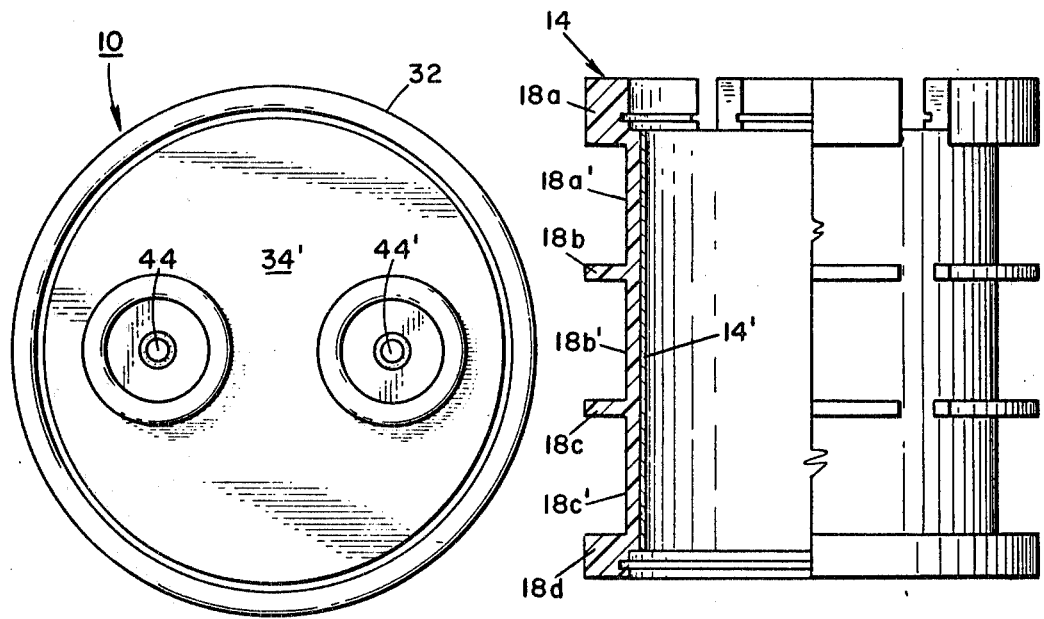
FIG. 2.
FIG. 3.

GEOPHONE WITH DAMPING COIL

RELATION TO OTHER APPLICATIONS

This application is a continuation-in-part of U.S. Patent Application Ser. No. 702,783, now abandoned, filed 7/6/76, assigned to the same assignee as this invention.

BACKGROUND OF THE INVENTION

1. Technical Field of the Invention

This invention is concerned with a means for applying an adjustable mechanical damping force to a moving-coil geophone.

2. Description of the Prior Art

Moving-coil geophones are commonly used in geophysical exploration to measure particle velocity of the earth due to seismic waves. A typical geophone consists essentially of an induction coil of fine insulated wire, resiliently suspended in an air gap between concentric pole pieces of a permanent magnet. Relative motion between the coil and the magnetic field induces a voltage in the coil proportional to the velocity of the relative motion. One such geophone is disclosed in U.S. Pat. No. 3,913,063 to Sears, this patent being incorporated herein by reference as an example of a commercial instrument.

A geophone is an oscillatory system. All such systems resonate at their natural frequency if undamped. If the damping factor is zero, the system will theoretically oscillate with infinite amplitude. The system will not oscillate if the damping factor is unity; it is then said to be critically damped. For geophysical operations, a damping factor of less than 1.0, or about 0.6 to 0.7 critical, is desired.

Absent external damping effects, certain geophone damping forces are inherent in the manufacture of the geophone. Damping may be mechanical, electrical, or viscous. The mechanical damping factor is inversely proportional to the combined mass of the coil and the bobbin upon which it is wound. If the bobbin includes a metallic portion, an induced EMF and Foucault or eddy currents are generated therein. The resultant current flow creates an electrical damping force that is directly proportional to the magnitude of the induced and eddy currents. The fluid in which the coil and bobbin are immersed, creates viscous damping. Since most commercial geophones are air-filled, rather than liquid-filled, viscous damping is negligible and can be ignored.

Mechanical damping and electrical damping are inversely related. Thus, if a larger mass is applied to the coil and bobbin to reduce the damping, the electrical damping may increase because of a larger cross sectional area of the mass and/or a change in electrical conductivity.

For a given geophone design, damping is inversely proportional to natural frequency in this sense:

If the damping of the geophone is near its optimum at a natural or resonant frequency of 14 Hz, then it will be overdamped at 7 Hz and underdamped at 28 Hz. Accordingly, some manufacturers offer geophones with either a brass or an aluminum bobbin. A brass bobbin adds mass to the coil assembly and reduces the damping. Brass bobbins are used for low frequency geophones, generally up to 8 Hz. The use of aluminum bobbins reduces the mass of the mass-coil assembly and increases the damping. Aluminum bobbins are used for higher frequency geophones. But, as previously mentioned, increasing or decreasing the mass of the bobbin, be it made from brass or aluminum, inversely affects the eddy-current damping produced by the bobbin if the cross-sectional area or the conductivity changes. For example, aluminum has higher conductivity per unit of mass than either copper or brass and, therefore, the eddy-current damping is increased when changing from a brass to an aluminum bobbin having the same mass, and vice versa. Other manufacturers provide weight rings of different sizes that may be affixed to the bobbin, to adjust the damping.

In summary, a mass may be applied to the bobbin of a geophone to provide a mechanical damping force that is inversely proportional to the size of the mass. If, as is usual, the mass is a closed metallic weight ring or cylinder, an opposing electrical damping force is developed due to the induced EMF and to Foucault or eddy-currents that are generated when the ring cuts the magnetic lines of force. Thus, if a larger weight ring is applied to the moving element to reduce the mechanical damping force, the decreased resistance and larger cross-sectional area cause an increase in the induced current and an increase in eddy-current flow, both of which increase the damping force.

Use of weight rings is quite common in the prior-art. For example, U.S. Pat. No. 3,582,875 to Van Wambeck shows a mass 87 applied to bobbin 7 (FIG. 1 of the patent) to adjust the peak frequency (a function of the damping coefficient) of the geophone.

In U.S. Pat. No. 3,913,063 to Sears, a mandrel 14' is fitted inside bobbin 14. (FIGS. 1 and 2 of the patent) to act as a damping mass.

In very low frequency seisometers such as the HS-10, 2-Hz geophone, made by Geospace, Inc. of Houston, Tex., weight rings are supplied to grossly tune the geophone frequency to an approximate desired value. If the weight rings form closed circuits, both induced and eddy-currents will generate electrical-damping counter forces. But even if the weight rings are split (open circuit) eddy-current electrical damping is still present.

Thus, in the prior art, the mechanical damping force can be changed step-wise in gross steps. But with each gross stepwise change in the mechanical damping force, the geophone designer must struggle with the opposing electrical damping force. Earlier inventors of geophones have not disclosed means for making a vernier weight ring that is substantially immune to the concomitant opposing changes in the electrical damping force.

SUMMARY OF THE INVENTION

In accordance with an aspect of this invention a vernier mass is applied to the bobbin of a moving coil geophone to provide a mechanical damping force. The size of the mass is continuously variable within predetermind limits. The mass is so designed that a change in the size of the mass results in no substantial opposing change in electrical damping forces.

In its most practical form, the damping member is an open-ended coil of insulated wire wound on the outer wall of a bobbin, separately from the active induction coil. Copper wire is more desirable than aluminum because of its higher density. The invention has application to any type of electromagnetic moving-coil geophone.

BRIEF DESCRIPTION OF THE DRAWINGS

FIG. 1 is a partial, sectional view of one type of geophone embodying the invention;

FIG. 2 is a top view of the geophone shown in FIG. 1; and

FIG. 3 is a perspective view, partly in section, of the bobbin.

DESCRIPTION OF THE PREFERRED EMBODIMENT

Since this invention is concerned with an improvement to electromagnetic geophones which are generally described in various patents, the description hereinafter given will be limited to the extent necessary for a proper understanding of my invention. The general construction of the geophone described herein is also shown in U.S. Pat. No. 3,913,063, assigned to the assignee of this invention. To the extent possible, the same numerals will be used to designate the same or similar parts.

Referring now to the drawings, there is shown one type of geophone embodying the present invention. It will be understood that the invention is not limited to any particular type of electromagnetic geophone but has application to various types of such geophones.

The geophone is generally designated as 10 and comprises a combined mass-coil assembly 12 concentrically mounted within a stationary magnet assembly 13.

The mass-coil assembly includes a unitary, generally-cylindrical bobbin having a thin wall provided with four radially-extending shoulders 18a–d. Shoulders 18a–b and 18c–d define therebetween two outer cradles 18a', 18c', respectively. Shoulders 18b–c define therebetween a center cradle 18b'. Cradles 18a', 18c' accomodate two induction coils 16, 16' connected in series. Each coil has a plurality of turns of fine insulated wire. The body of bobbin 14 is made from a suitable plastic material. End shoulders 18a, 18d support spring spiders 22–22', respectively. The mass-coil assembly 12 is resiliently suspended from the two springs 22–22'. Spring 22' is a compound spring having a flat portion 22" and a conical portion 22'". This compound spring 22' is substantially linear in tension and compression. The construction and arrangement of springs 22–22' is more fully described in U.S. Pat. No. 3,878,504, also assigned to the assignee of this invention.

The stationary, magnet assembly 13 includes a hollow, outer cylinder 32 which is closed at the top and bottom by insulating cover plates 34–34'. In addition to rendering the inner volume 36 of case 32 fluid tight, plates 34–34' serve as support and centering elements as well.

The magnetic field is created by a permanent magnet 40 provided with upper and lower pole pieces 42–42', each having a substantially Z-shaped cross section to secure and centrally maintain the magnet within the casing. A pair of outer terminal posts 44–44" extend outwardly from the upper plate 34' to allow the coils 16–16' to be electrically connected to an outside utilization device, typically via a geophone cable. An inspection of the drawings will reveal that the various components of the mass-coil and magnet assemblies are press-fitted whenever possible and mounted inside the casing 32.

In operation, the mass-coil assembly 12 is the inertial element of the geophone and is suspended by the springs 22-22' in the cylindrical air gap 36 provided by the magnet assembly 13. The earth's vibration causes relative motion between the induction coils 16–16' and the magnet assembly 13, thereby generating a voltage in the coils, proportional to particle velocity, which becomes available at the output terminals 44–44'.

Inside the plastic bobbin 14 is a hollow cylindrical mandrel 14' made from a light-weight, conducting metal preferably aluminum. The outer diameter of mandrel 14' is slightly larger than the inner diameter of bobbin 14 to obtain a tight fit therebetween. Sufficient clearance is provided by the width of gap 36 so that the concentrically-mounted, mass-coil assembly 12 can move freely in the air gap. Although a small amount of mechanical damping is applied by element 14', it primarily reinforces the thin cylindrical wall of plastic bobbin 14, whose wall thickness may be on the order of only 0.005 inch.

In the center cradle 18b' is provided a vernier mechanical damping mass, generally designated as 50. In practice, member 50 is a wound coil 16", preferably of fine insulated wire such as #40 AWG. The wire is preferably copper but it may be aluminum.

Coil 16" is open-ended. Accordingly, since the open-ended coil offers a substantially infinite impedance, the current due to the induced EMF will be virtually zero. Because the cross-sectional area of #40 AWG wire is very small, about 0.003 inch, eddy-currents will be minimal. The wire is preferably enameled so that electrical contact between turns is not possible. If the adjacent turns of wire were to become short-circuited, the cross sectional area of damping member 50 would effectively increase, allowing undesired, large eddy-currents to flow.

The mass of mechanical damping member 50 is made continuously adjustable between any desired limits, by simply winding a desired number of turns and a fraction thereof, in cradle 18b'. For reasons recited above, electrical-damping counter forces are virtually non-existent regardless of the size of member 50. Thus, mechanical damping member 50 is a vernier mass, used with a main mass composed of bobbin 14, mandrel 14', and the active signal producing coils 16 and 16', in order to obtain a fine adjustment of the total mass.

Accordingly, a significant advantage of the present invention lies in the fact that it allows one to easily increase or decrease the inertial mass of the coil assembly 12 and thus to correspondingly decrease or increase its mechanical damping in order to adjust the peak frequency, without effecting an offsetting change in its electrical damping. Also, by precisely controlling the number of turns of the insulated copper wire in the damping coil 16", it is possible to precisely control the damping characteristics of the geophone. With an automatic winding machine it is easily possible to continuously change the geophone's damping as a function of wire length.

Another significant advantage of the present invention lies in the fact that a single standard bobbin can be constructed for geophones having a wide frequency range. For example, a standard bobbin can now be constructed such that the damping of the geophone would be optimum to tune its natural frequency to 28 Hz without the use of damping coil 16". For 7 Hz, this geophone would be overdamped. But merely by winding the required number of turns of insulated copper wire in the center cradle 18b', the mechanical geophone damping is reduced to precisely tune the geophone to a desired natural frequency of 7 Hz, without rebuilding the bobbin. Previously, it will be remembered, additional mass necessitated the addition of weight rings. A mass reduction in the above example would involve trimming of excess metal from the bobbin itself.

It is true that the coil and bobbin mass could be changed by changing the number of turns of wire in the induction coils themselves but to do so would adversely affect the geophone output signal which would decalibrate the sensor. Hence the need for a third, independent, unterminated coil.

What is claimed is:

1. An improved electromagnetic geophone assembly of the type having a casing, a permanent magnet mounted in said casing, and an inertial member having a signal-producing induction coil wound thereon, said coil having signal output terminals, the inertial member and said induction coil being resiliently suspended for motion relative to the magnetic field of said permanent magnet, the improvement comprising:

a vernier mass consisting of an open-ended coil of insulated wire having a very small cross-sectional area to keep eddy currents to a minimum, mounted on said inertial member for applying a desired finely-adjustable mechanical damping force to said resiliently suspended inertial member.

2. The geophone assembly as defined in claim 1 wherein said vernier mass has a desired number of turns.

3. The geophone assembly as defined in claim 1 wherein the weight of said vernier mass is smoothly adjustable within desired limits for mechanically tuning said resiliently suspended inertial member to a desired natural frequency.

* * * * *